(No Model.) 2 Sheets—Sheet 1.
V. A. GLEASON.
DEVICE FOR HOLDING SHOVELS ONTO CULTIVATOR SHANKS.
No. 601,561. Patented Mar. 29, 1898.
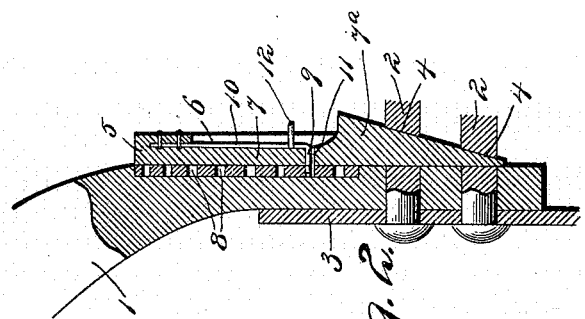
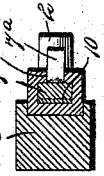
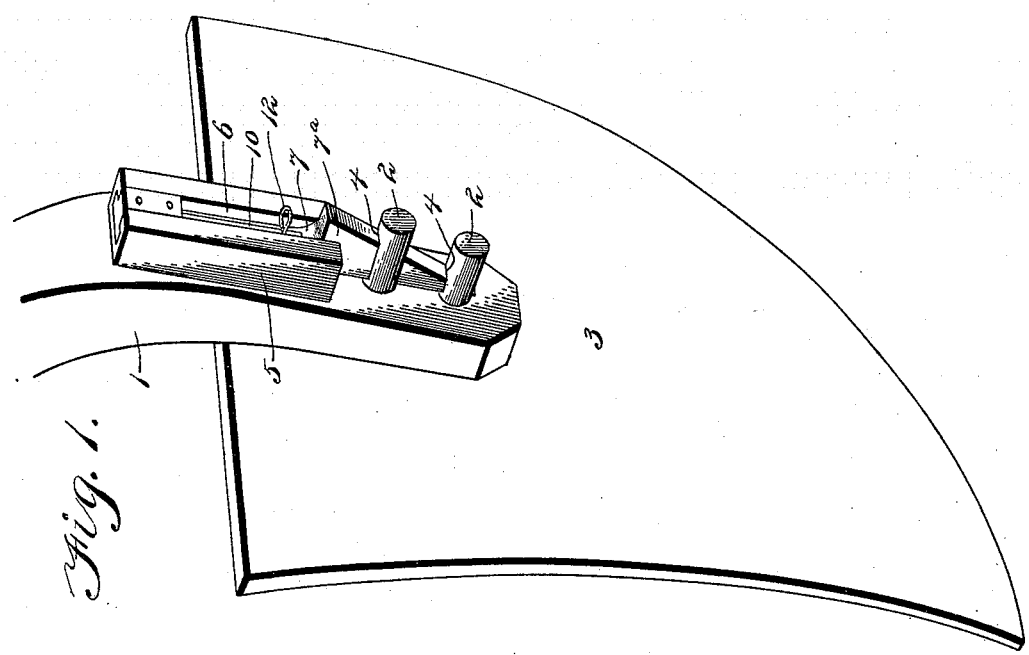
Witnesses
Milton O'Connell
Victor J. Evans
Inventor
Vesper A. Gleason,
By John Wedderburn, Attorney

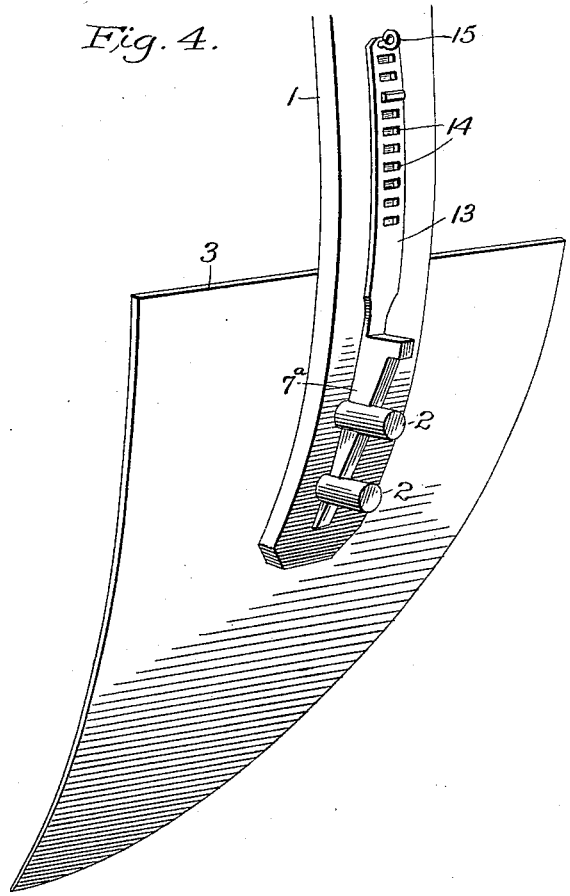

UNITED STATES PATENT OFFICE.

VESPER ARVY GLEASON, OF SOUTH RIVERSIDE, CALIFORNIA.

DEVICE FOR HOLDING SHOVELS ONTO CULTIVATOR-SHANKS.

SPECIFICATION forming part of Letters Patent No. 601,561, dated March 29, 1898.

Application filed June 24, 1897. Serial No. 642,091. (No model.)

*To all whom it may concern:*

Be it known that I, VESPER ARVY GLEASON, of South Riverside, in the county of Riverside and State of California, have invented certain new and useful Improvements in Devices for Holding Shovels onto Cultivator-Shanks; and I do hereby declare the following to be a full, clear, and exact description of the invention, such as will enable others skilled in the art to which it appertains to make and use the same.

The invention relates to means for securing cultivator shovels or teeth to the cultivator standard or beam, whereby the labor of attaching and detaching the teeth or shovels is greatly facilitated as compared with the means ordinarily employed for the same purpose.

It consists in the combination, with a cultivator standard or beam supporting the shovels or teeth, of an adjustable wedge or key for engaging the slotted shovel-shanks and means for holding the wedge or key at the required adjustment, as hereinafter described and claimed.

In the accompanying drawings, Figure 1 is a perspective view of the cultivator standard or beam with the improvement applied. Fig. 2 is a vertical longitudinal section through the same, and Fig. 3 is a transverse section looking to the rear. Fig. 4 is a perspective view of the wedge or key shown applied to a curved spring which acts to hold the wedge at the desired adjustment.

1 indicates the cultivator standard or beam of any usual construction, preferably expanded in width near its rear end and perforated to receive the bolts 2 of the cultivator shovels or teeth 3. These bolts are provided in their upper projecting ends with vertical longitudinally-extending slots 4, the upper walls of which are preferably inclined toward the rear to adapt them to the form of the wedge or key employed for securing them in place. Upon the standard or beam 1 is secured a longitudinally-grooved block or bar 5, the groove 6 in which is made, preferably, in the inverted-T shape shown in Fig. 3, but may be made in the ordinary dovetailed form for retaining the shank 7 of the sliding wedge or key 6 therein, said shank being made in a form in cross-section to correspond in shape with the groove in which it slides. The lower wall of the grooved block is provided at short intervals with a series of transverse slots 8; but, if preferred, the lower wall may be provided with a series of ratchet-teeth, the forward faces of which are inclined to permit the ready passage over them of the engaging pawl adapted to engage a pawl 9 on one end of a spring 10, secured to the upper face of the key-shank 7, the pawl or latch 9 passing through a slot 11 in the shank 7 to engage the slots or teeth on the lower face of the grooved block for holding the shank of the key or wedge attached thereto at any desired adjustment. The yielding end of the spring 10 is provided with a loop or handle 12, by means of which the latch or pawl may be lifted out of engagement with the slots or teeth in the lower wall of the grooved block for permitting the adjustment of the shank and of the wedge or key connected therewith. Preferably the key 6 is made tapering or wedge-shaped, and the slots in the shanks of the shovels will be of varying height to correspond to the shape of the said tapering key, so that the same key may be made to engage two or more shanks in the beam at a single operation.

By the construction described it will be seen that by simply lifting the pawl holding the key-shank in engagement with the grooved block fast on the cultivator-beam the key may be moved into and out of engagement with the shanks of the shovels applied to the said beam for adapting the same to be engaged with or removed from said beam, as may be required, and this work can be accomplished in the time which the operator would ordinarily spend in looking for a wrench for removing the shovel-beams as ordinarily applied, thereby greatly facilitating the labor of attaching and detaching the shovels and economizing the time of the operator.

In the construction shown in Fig. 4 the wedge or key 7ª is shown secured to a slightly-curved strap-spring 13. The upper portion of said spring is adapted to engage the ratchet teeth or slots for holding the key at the desired adjustment, or it may be provided with a series of slots 14, adapting it to engage a projection on the cultivator-shank. It is provided near the end of its shank with a knob or ring 15, adapting it to be lifted out of engagement with the rack-bar.

The construction of the wedge-shank last above described is preferred, as being simpler and less expensive in construction, and for the further reason that if the wedge works loose the tension of the spring serves to compensate therefor and to hold the shank of the tooth or shovel firmly in place.

The key constructed as described is adapted to be used also for securing plow points and shares and in other places where parts are required to be frequently removed and renewed or replaced.

Having thus described the invention, what I claim as new, and desire to secure by Letters Patent, is—

1. The combination, with the cultivator-standard, shovel, and slotted bolts securing the latter to the former, of the detachable wedge-key, adapted for adjustment in the bolt-slots, and a spring locking device attached to the shank of said key and having its lower end bent inward and adapted to engage the cultivator-standard, as shown and described.

2. The combination with the perforated cultivator standard or beam, of shovels having slotted bolts engaging said beam, a sliding wedge or key adjustable in ways on said beam for engaging and releasing the shovel-bolts, and means for holding said wedge or key at the desired adjustment, substantially as described.

In testimony whereof I have signed this specification in the presence of two subscribing witnesses.

V. ARVY GLEASON.

Witnesses:
J. C. GLEASON,
FLORA S. GLEASON.